United States Patent
Weist et al.

(10) Patent No.: US 7,819,947 B2
(45) Date of Patent: Oct. 26, 2010

(54) OZONE PRODUCTION BY PRESSURE SWING ADSORPTION USING A PROTECTIVE ADSORBED COMPONENT

(75) Inventors: Annemarie Ott Weist, Macungie, PA (US); Edward Landis Weist, Jr., Macungie, PA (US)

(73) Assignee: Air Products and Chemical, Inc., Allentown, PA (US)

( * ) Notice: Subject to any disclaimer, the term of this patent is extended or adjusted under 35 U.S.C. 154(b) by 230 days.

(21) Appl. No.: 12/029,695

(22) Filed: Feb. 12, 2008

(65) Prior Publication Data

US 2009/0199710 A1 Aug. 13, 2009

(51) Int. Cl.
*B01D 53/02* (2006.01)
*B01D 53/047* (2006.01)

(52) U.S. Cl. .......................... 95/98; 95/138
(58) Field of Classification Search ............. 95/96–105, 95/117, 138; 422/183.07–186.2
See application file for complete search history.

(56) References Cited

U.S. PATENT DOCUMENTS

| | | | |
|---|---|---|---|
| 5,370,846 A | 12/1994 | Yokomi et al. | |
| 5,810,910 A | 9/1998 | Ludwig et al. | |
| 5,810,978 A | 9/1998 | Nakatsuka et al. | |
| 5,846,298 A | 12/1998 | Weist, Jr. | |
| 6,030,598 A | 2/2000 | Topham et al. | |
| 6,214,199 B1 | 4/2001 | Izumi et al. | |
| 6,254,763 B1 | 7/2001 | Izumi et al. | |
| 6,254,962 B1 | 7/2001 | Izumi et al. | |
| 6,503,469 B2 | 1/2003 | Izumi et al. | |
| 6,528,024 B2 | 3/2003 | Izumi et al. | |
| 6,533,999 B1 | 3/2003 | Izumi et al. | |
| 6,555,072 B2 | 4/2003 | Izumi et al. | |
| 6,916,359 B2 * | 7/2005 | Jain | 95/99 |
| 2001/0001651 A1 | 5/2001 | Izumi et al. | |
| 2001/0007304 A1 | 7/2001 | Izumi et al. | |
| 2001/0042691 A1 | 11/2001 | Izumi et al. | |

FOREIGN PATENT DOCUMENTS

| | | |
|---|---|---|
| DE | 196 48 514 A1 | 5/1997 |
| EP | 0 884 275 A2 | 12/1998 |
| EP | 1 359 120 A | 11/2003 |
| JP | 06-021010 B | 3/1994 |

OTHER PUBLICATIONS

Weist, Annmarie et al; U.S. Appl. No. 12/358,310; Ozone Production by Pressure Swing Adsorption Using a Noble Gas Additive; filed Jan. 23, 2009.

* cited by examiner

*Primary Examiner*—Frank M Lawrence
(74) *Attorney, Agent, or Firm*—Rosaleen Morris-Oskanian

(57) ABSTRACT

Adsorption process for recovering ozone from a feed gas mixture containing at least ozone and oxygen comprising (a) introducing the feed gas mixture into a first end of an adsorber vessel containing a zeolite adsorbent and selectively adsorbing ozone on the adsorbent; (b) withdrawing from a second end of the vessel a stream of oxygen essentially free of ozone; (c) terminating the flow of the feed gas mixture, introducing a purge gas into the second end of the vessel, and withdrawing from the first end of the vessel an outlet gas mixture containing at least purge gas and desorbed ozone; and (d) introducing an additional component into the feed gas mixture and/or the purge gas and adsorbing the additional component on the zeolite adsorbent. The additional component when adsorbed reduces the decomposition of ozone that would occur in the absence of the additional component adsorbed on the zeolite adsorbent.

26 Claims, 4 Drawing Sheets

OZONE PRODUCTION BY PRESSURE SWING ADSORPTION USING A PROTECTIVE ADSORBED COMPONENT

BACKGROUND OF THE INVENTION

Ozone is a reactive triatomic allotrope of oxygen that has applications in chemical production, disinfection, drinking water treatment, air purification, bleaching of fabrics and wood pulp, wastewater treatment, and food processing. Most of the ozone used in these applications is produced by corona discharge systems using air or high-purity oxygen as the feed gas. Ozone also may be produced from air or oxygen by the action of ultraviolet light or by cold plasma generators.

High purity oxygen is used as the ozone generator feed gas in most large industrial applications of ozone. The conversion of oxygen into ozone in commercial corona discharge generators is typically between 4 and 13%, and in certain applications the resulting oxygen-ozone mixture is provided as product directly to the downstream user without further treatment. Because the cost of the unreacted oxygen is a major part of the ozone system operating cost, it is desirable in many situations to recover the oxygen from the oxygen-ozone mixture for recycle to the ozone generator. This can be accomplished, for example, by pressure swing adsorption (PSA) in which ozone is selectively adsorbed from the ozone generator outlet stream, and the recovered ozone-depleted oxygen is recycled to the ozone generator. The adsorbed ozone is desorbed by a sweep gas such as air or nitrogen, and the mixture of ozone and sweep gas is provided as product to the downstream user.

Ozone-oxygen PSA systems often use zeolite adsorbents for the selective adsorption of ozone from oxygen. It is known that zeolite adsorbents can promote the decomposition of ozone, and the degree of ozone decomposition can adversely affect ozone cost and increase the operating cost of the ozone-consuming process. The degree of ozone decomposition can be reduced by using a zeolite that contains pre-adsorbed components such as water, carbon dioxide, argon, or sulfur hexafluoride as described in U.S. Pat. No. 5,810,910. These components, which are non-reactive with ozone, are adsorbed on the adsorbent prior to ozone adsorption.

There is a need in the art of ozone generation for improved PSA processes to reduce ozone decomposition, thereby improving process economics and reducing the overall unit cost of generated ozone. This need is addressed by the embodiments of the invention described below and defined by the claims that follow.

BRIEF SUMMARY OF THE INVENTION

An embodiment of the invention relates to an adsorption process for the recovery of ozone from a feed gas mixture containing at least ozone and oxygen comprising (a) introducing the feed gas mixture into a first end of an adsorber vessel containing a zeolite adsorbent and selectively adsorbing ozone on the adsorbent;

(b) withdrawing from a second end of the adsorber vessel a stream of oxygen essentially free of ozone;

(c) terminating the flow of the feed gas mixture to the adsorber vessel, introducing a purge gas into the second end of the adsorber vessel, and withdrawing from the first end of the vessel an outlet gas mixture containing at least purge gas and desorbed ozone; and (d) introducing an additional component into the feed gas mixture and/or the purge gas and adsorbing the additional component on the zeolite adsorbent, wherein the additional component when adsorbed reduces the decomposition of ozone that would occur in the absence of the additional component adsorbed on the zeolite adsorbent.

Another embodiment of the invention includes a process for the production of ozone comprising (a) introducing an oxygen feed stream into an ozone generator and withdrawing therefrom a mixture of oxygen and ozone;

(b) combining the mixture of oxygen and ozone with a supplemental stream comprising humidified oxygen to form a combined stream comprising oxygen, ozone, and water;

(c) passing the combined stream into a pressure swing adsorption system and selectively adsorbing ozone and water in an adsorption step on a zeolite adsorbent contained therein, wherein the water when adsorbed reduces the decomposition of ozone that would occur in the absence of adsorbed water on the zeolite adsorbent;

(d) withdrawing from the pressure swing adsorption system an oxygen outlet stream essentially free of ozone;

(e) terminating the flow of the combined stream into the pressure swing adsorption system, introducing a purge gas into the pressure swing adsorption system in a regeneration step, and withdrawing therefrom a product gas comprising ozone, the additional component, and purge gas; and either (f) humidifying a portion of the oxygen outlet stream of (d) to provide the supplemental stream comprising humidified oxygen in (b) and combining the remaining portion of the oxygen outlet stream with a makeup oxygen stream to provide the oxygen feed stream of (a), or (g) humidifying a portion of a makeup oxygen stream to provide the supplemental stream comprising humidified oxygen in (b) and utilizing the oxygen outlet stream of (d) to provide the oxygen feed stream of (a).

A related embodiment is directed to an adsorption process for the recovery of ozone from a feed gas mixture containing at least ozone and oxygen comprising (a) introducing the feed gas mixture into a first end of an adsorber vessel containing a modified zeolite adsorbent having an additional component adsorbed thereon and selectively adsorbing ozone on the modified zeolite adsorbent, wherein the additional component when adsorbed reduces the decomposition of ozone that would occur in the absence of the additional component adsorbed on the zeolite adsorbent;

(b) withdrawing from a second end of the adsorber vessel a stream of oxygen essentially free of ozone; and (c) terminating the flow of the feed gas mixture to the adsorber vessel and withdrawing from the first end of the vessel an outlet gas containing at least desorbed ozone;

wherein the additional component is introduced into the adsorber vessel by any of (1) combining at least a portion of the additional component with a portion of the oxygen stream of (b) to provide a supplemental stream comprising oxygen and the additional component, and combining the supplemental stream with the feed gas mixture in (a), (2) combining at least a portion of the additional component with a portion of a makeup oxygen stream to provide a supplemental stream comprising oxygen and the additional component, and combining the supplemental stream with the feed gas mixture in (a), (3) combining at least a portion of the additional component with a purge gas to provide a modified purge gas, and introducing the modified purge gas into the adsorber vessel in step (c), and (4) injecting at least a portion of the additional component directly into the feed gas mixture prior to the adsorber vessel in step (a).

DETAILED DESCRIPTION OF THE EMBODIMENTS OF THE INVENTION

Figure 1:
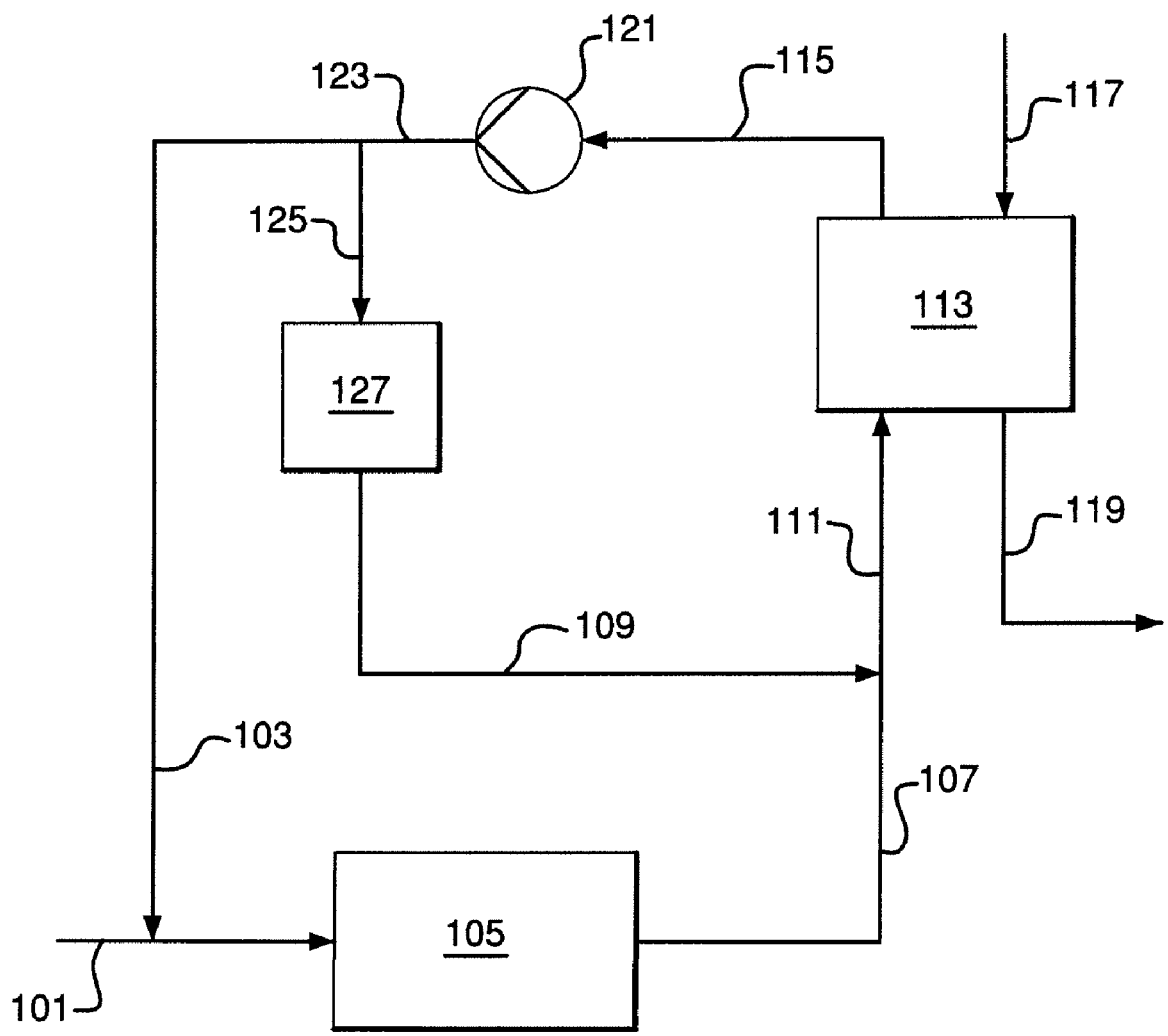
FIG. 1 is a process flow diagram of an embodiment of the present invention.

Embodiments of the invention are directed to the introduction of an additional component to any of the process gas streams introduced into PSA systems that use zeolite adsorbents to recover ozone from gas mixtures comprising ozone and oxygen. The additional component may be introduced into the ozone-oxygen feed gas and/or into the purge gas used to desorb the adsorbed ozone during a regeneration and product recovery step. The additional component may be introduced into the feed gas and/or purge gas streams during any portion of the feed step and/or any portion of the purge step.

The additional component is adsorbed on the adsorbent to provide a protective adsorbed component that reduces the degree of ozone decomposition that would occur in the absence of the protective adsorbed component on the zeolite adsorbent. The additional component is introduced into the feed gas and/or the purge gas so that there is no need for a separate process step to treat the adsorbent prior to the operation of the ozone-oxygen PSA separation cycle. The introduction of the additional component thus becomes an integral part of the ozone-oxygen PSA separation cycle. The additional component may be selected from the group consisting of water, carbon dioxide, argon, sulfur hexafluoride, and mixtures thereof.

The term "component" as used herein means one or more elements and/or compounds that are amenable to adsorption on a zeolite adsorbent. The component may be a single element or compound; alternatively, the component may be two or more elements and/or compounds. The component typically is in the gaseous state when unadsorbed and exists as an adsorbate phase when adsorbed.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "he" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Embodiments of the invention are illustrated below by a process in which water is used as the additional component that forms the protective adsorbed component in a zeolite PSA system. In this process, the ozone generator discharge flowing into the PSA beds is very dry and therefore will dry the zeolite eventually. The inlet region of the adsorbent bed will dry first, and this region has the highest concentrations of ozone in the feed contacting the adsorbent. The process objective in this embodiment is to keep the inlet region of the adsorbent bed moist while maintaining a low dew point in the oxygen stream leaving the bed for recycle to the ozone generator. Ozone generators require low moisture in the feed gas (e.g., a dew point below about −70° F.) because $NO_x$ may be present in the generator and could react with moisture if present to form nitric acid.

In order to maintain a protective adsorbed water component at the adsorbent bed inlet while controlling moisture to a very low level in the oxygen stream discharged from the bed, a portion of the oxygen discharge stream may be withdrawn from the PSA system, humidified, and mixed with the ozone-oxygen feed stream to the PSA system. The remaining portion of the oxygen discharge stream is recycled to the ozone generator inlet. The amount of water added in the humidification step may be controlled so that the degree of ozone decomposition in the adsorbent bed in the adsorber vessel is maintained below a predetermined level. Controlled direct injection and vaporization of water into the mixed ozone- and oxygen-containing stream entering the adsorber vessels may be used as an alternate method of introducing the additional component to the adsorbent.

While it may be desirable to eliminate ozone decomposition completely, in practice a low level of ozone decomposition may be acceptable. For example, reducing the duration of the adsorption feed step can reduce ozone decomposition but also can reduce the oxygen recovery for recycle to the ozone generator. Adding too much water in the humidification step may increase the potential for water in the ozone generator feed, which in turn may require modification of the PSA cycle or the use of a separate drier for the oxygen stream recycled to the ozone generator. An acceptable economic balance between ozone decomposition and oxygen recovery can be achieved in practical ozone system PSA operation. It has been found, for example, that a tolerable level of ozone decomposition can range up to 5% of the amount of ozone in the feed gas mixture. The acceptable level of ozone decomposition therefore may be less than about 5% of the amount of ozone in the PSA feed gas mixture.

An illustration of an embodiment of the invention is shown in FIG. 1. Makeup oxygen enters the process via line 101 and is mixed with recycled oxygen from line 103. Makeup oxygen is defined as oxygen provided from an oxygen supply system external to the ozone generation and PSA systems in any of the embodiments FIGS. 1-4. The combined feed flows into ozone generator 105, which can be any known type of ozone generator, wherein 4 to 13% of the oxygen is converted into ozone. The ozone-oxygen mixture flows via line 107, is mixed with humidified oxygen provided via line 109, and the resulting gas mixture comprising ozone, oxygen, and water flows via line 111 to PSA system 113. This gas mixture may contain, for example, 3 to 10 mole % ozone, 0 to 1 mole % argon, 0 to 5 mole % nitrogen, 84 to 97 mole % oxygen, and 0 to 0.002 mole % water.

The PSA feed gas flowing via line 111 passes through one of a plurality of adsorber vessels in PSA system 113 containing a zeolite adsorbent. Ozone and water are selectively adsorbed therein, and a purified oxygen stream is withdrawn from the vessel and from PSA system 113 via line 115. This stream is essentially free of ozone, i.e., it contains less than 0.1 mole % ozone, and is essentially free of water, i.e., it has a dew point of less than −70° F. During this feed step, another adsorber vessel that previously had completed the feed step is regenerated by purging with purge gas supplied via line 117.

A product effluent gas containing ozone, water, and purge gas is withdrawn via line 119 and delivered to a downstream ozone-consuming process. The purge gas may be air, nitrogen, oxygen, or any other non-adsorbing gas that is acceptable to the user of the ozone-purge gas product mixture. The zeolite adsorbent may be selected from the group consisting of chabazite, erionite, mordenite, offretite, ZSM-5, HZSM-5, ZSM-11, ZSM-12, L-zeolite, ferrierite, beta zeolite, Y-type zeolite, and combinations thereof.

Any appropriate PSA cycle may be used in the operation of PSA system 113. Representative cycles useful for this application are described in U.S. Pat. Nos. 5,846,298 and 6,030,598, both of which are wholly incorporated herein by reference.

The purified oxygen stream in line 115 is compressed in compressor 121, a portion is withdrawn as a sidestream via line 125, and the portion is humidified in humidification system 127 to provide the humidified oxygen via line 109 described above. Alternatively, compressor 121 may be replaced by a compressor (not shown) to compress the purified oxygen in line 103 and a smaller compressor (not shown) to compress the oxygen in line 125 to humidifier 127. The humidified oxygen may have a relative humidity in the range of 20 to 100%, and the actual relative humidity of the combined stream 111 is selected to provide the required amount of process water as described below. The relative humidity of combined stream 111 may be in the range of 0.5 to 20%. The remaining portion of the compressed oxygen from line 123 is withdrawn via line 103 to recycle the oxygen to ozone generator 105 as described above. The flow of oxygen via line 125 for humidification may be 0.5 to 20% of the compressed oxygen in line 123.

Figure 2:
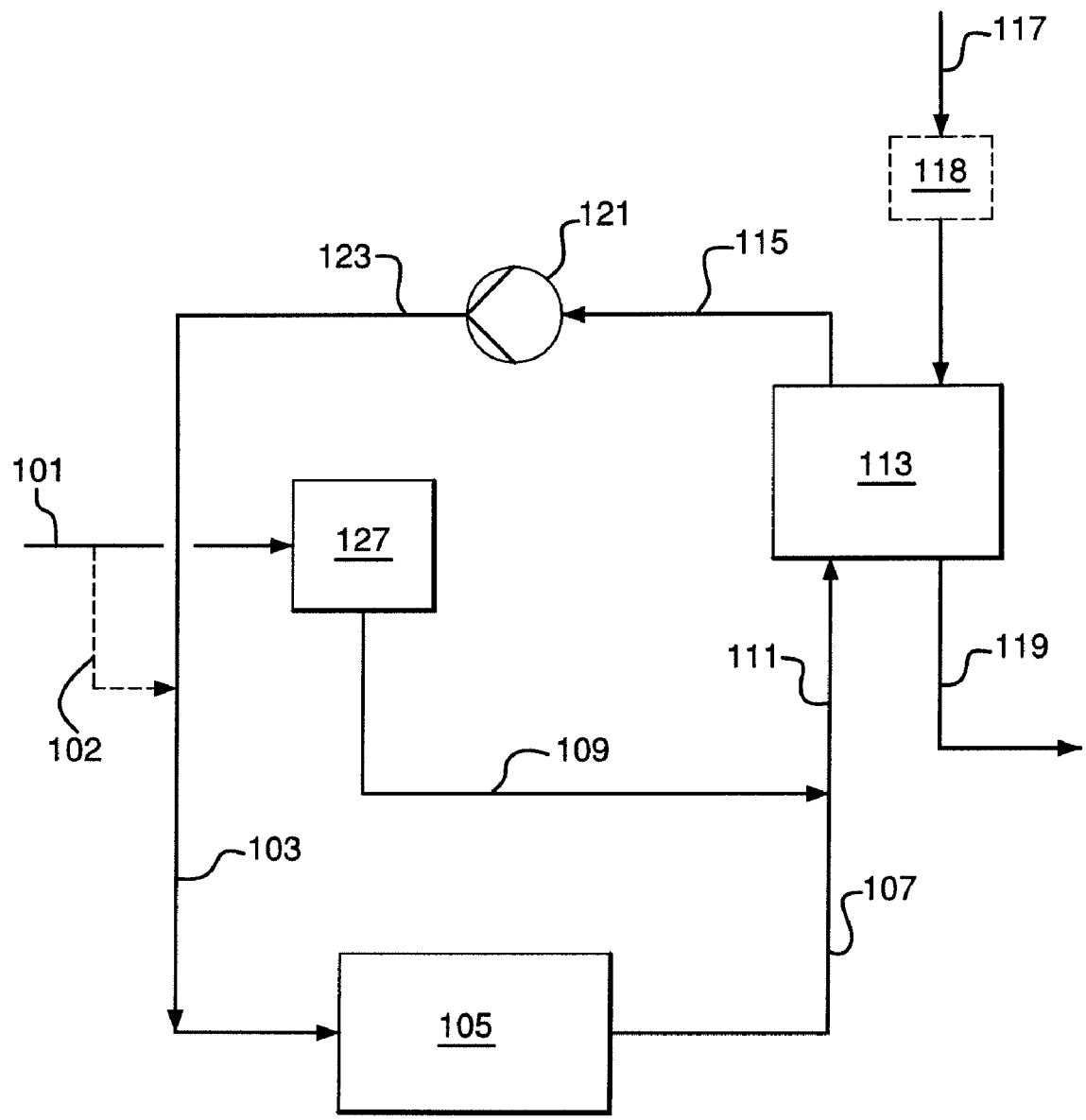
FIG. 2 is a process flow diagram of an alternative embodiment of the invention.

Alternative embodiments are possible for introducing water into PSA system 113 and are illustrated in FIG. 2. In one alternative, makeup oxygen via line 101 is humidified in humidification system 127 and the resulting humidified oxygen is withdrawn via line 109 and combined with the ozone-oxygen mixture from line 107 to provide the humidified PSA feed in line 111. PSA outlet gas after compression in compressor 121 is recycled via lines 123 and 103 to ozone generator 105. If desired, a portion of the makeup oxygen in line 101 may be introduced into the recycled PSA offgas via line 102. Additionally or alternatively, water may be added to PSA system 113 by humidifying the purge gas provided in line 117 in alternative humidification system 118. In another alternative, water addition to the PSA system may be provided by the use of both humidification systems 118 and 127.

In the mode of operation described above, a steady state water balance is determined such that the amount of moisture introduced via the humidified oxygen is sufficient to maintain the degree of ozone decomposition below a predetermined upper limit such as, for example, less than about 5% of the amount of ozone in the PSA feed gas mixture provided via line 111. In this steady state water balance, the water adsorbed in each adsorber vessel of PSA system 113 is removed by the sweep gas in the product effluent stream inline 119.

The amount of water addition required via line 109 typically is a function of several operating parameters such as, for example, the amount of ozone provided in line 107, the type of adsorbent used, the PSA cycle, the PSA operating temperature, and the acceptable degree of ozone decomposition in PSA system 113. The amount of required water addition is difficult to predict, and in actual practice the amount may be determined by varying the flow rate of the oxygen sidestream in line 125 and/or the level of humidification in humidification system 127 until an acceptable level of ozone decomposition is achieved. In practice, the molar ratio of water to ozone in the PSA feed gas mixture in line 111 may be in the range of 0.0002 to 0.07.

The adsorption step may be operated such that some or all of the adsorbent in contact with ozone has a water loading of between 0.5 and 15 weight % based on dry adsorbent. This adsorbed water acts as a protective adsorbed component to reduce or eliminate the potential for ozone decomposition that can occur when ozone contacts dry zeolite adsorbent.

It is possible under certain process conditions that all water adsorbed in PSA system 113 cannot be removed by the purge gas during regeneration of the adsorber vessels. Under these conditions, some water may desorb into the oxygen stream during the adsorption step, and the oxygen recycled to ozone generator 105 via line 103 therefore may contain some water. This is not acceptable for the reasons discussed above, and the water in the oxygen recycle stream therefore must be removed. This may be achieved by any gas drying method known in the art; two embodiments for drying the recycled oxygen are described below.

Figure 3:
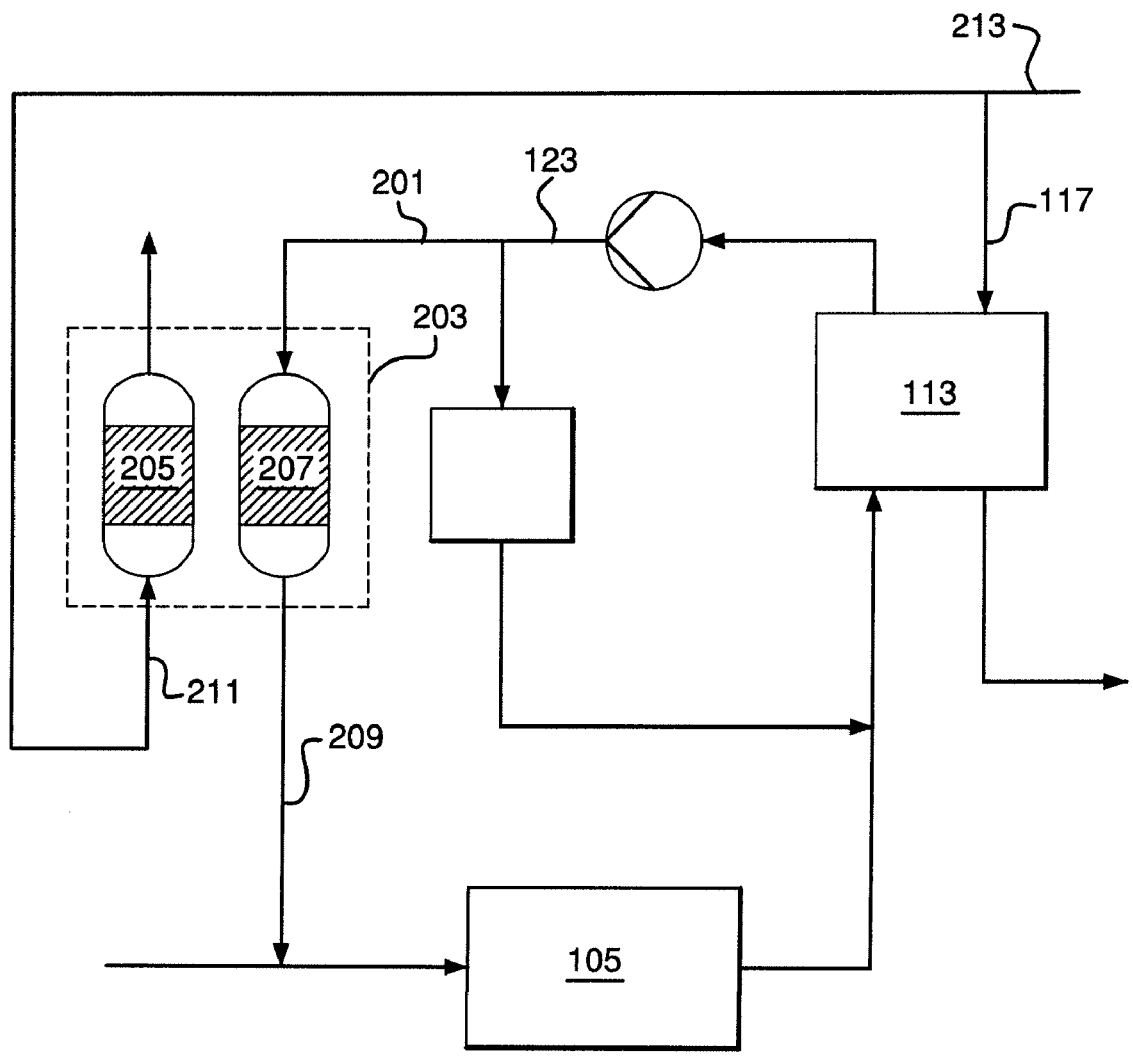
FIG. 3 is a process flow diagram of an alternative embodiment of the invention.

FIG. 3 illustrates one method for removing water in the embodiment of FIG. 1 from the feed to ozone generation system 105 in which a portion of the compressed oxygen in line 123 is withdrawn via line 201 to adsorptive drying system 203. This system may be any known type of cyclic multiple-bed adsorption drying system in which water is adsorbed in one bed while another bed is regenerated by pressure reduction and optionally heating while being purged with a regeneration purge gas. Adsorptive drying system 203 comprises two switching adsorbent beds 205 and 207 containing any commercially-available adsorbent selective for water such as, for example, activated alumina, silica gel or zeolite. As shown here, bed 207 operates in an adsorption step wherein water is adsorbed from the oxygen provided in line 201 and dried oxygen recycle flows via line 209. At the same time, bed 205, which previously had operated in the adsorption step, is regenerated using purge gas provided via line 211. This purge gas and the purge gas provided via line 117 for regeneration in PSA system 113 may be provided from a common source via line 213. The purge gas may be air, nitrogen oxygen, or any other dry gas that is acceptable to the user of the ozone-sweep gas product mixture.

Figure 4:
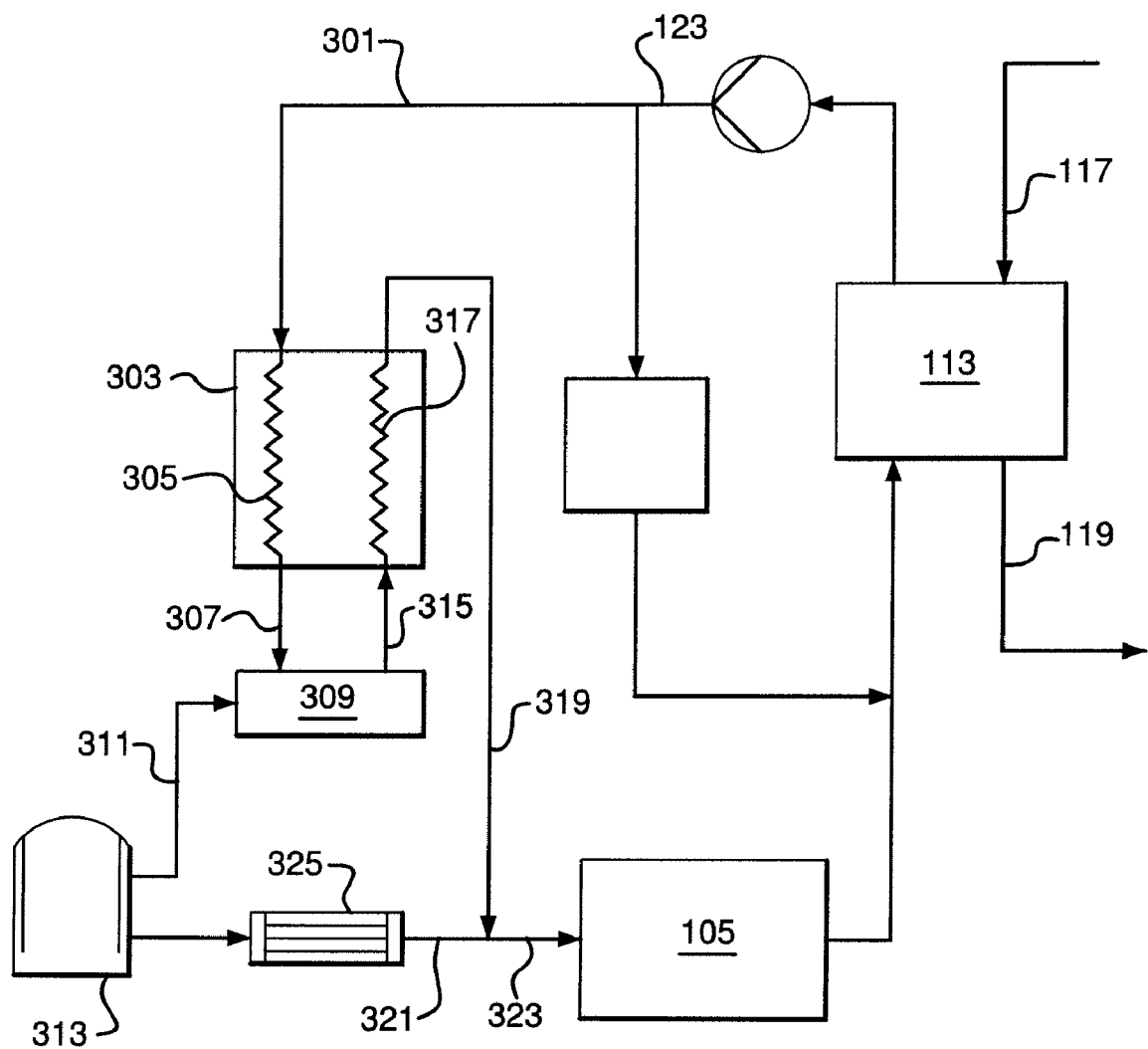
FIG. 4 is a process flow diagram of a further embodiment of the invention.

Another method for drying the oxygen recycle to the ozone generation system 105 of FIG. 1 is illustrated in FIG. 4. The portion of the compressed oxygen in line 123 to be recycled is withdrawn via line 301 and introduced into counter-current heat exchanger 303 where it is cooled in representative passage 305 to temperatures below 32° F. and as low as −90° F., thereby freezing the water onto the walls of passage 305. The cooled dry oxygen is withdrawn via line 307 and mixed in mixing zone 309 with a small amount of liquid oxygen provided via line 311 from liquid oxygen storage tank 313. Some or all of the liquid oxygen may vaporize in mixing zone 309. The cold oxygen stream, which may contain residual vaporizing liquid oxygen, flows via line 315 into passage 317 of heat exchanger 303 and warms therein to provide the refrigeration for freezing the water in representative passage 305. The amount of liquid oxygen needed via line 311 will depend on the temperature difference in heat exchanger 303, the oxygen flow rate in line 301, and the required dew point of the ozone generator feed gas in line 323.

Dried and warmed oxygen flows via line 319, is combined with additional oxygen from line 321, and the combined oxygen stream flows via line 323 to ozone generator 105. The water dew point in the oxygen in line 323 should be sufficiently low, e.g., a dew point less than −70° F., to allow proper operation of the ozone generator. Additional oxygen makeup is provided via line 321 by vaporizing additional liquid oxygen from tank 313 in vaporizer 325. A portion of the required makeup oxygen to the ozone generator thus is provided via line 321 and the remaining portion is provided via line 319 along with recycled oxygen.

The operation of heat exchanger 303 should include the removal of the ice formed in passage 305. This may be accomplished by taking the exchanger offline intermittently to melt and remove the ice. Alternatively, two parallel switching exchangers may be used wherein one exchanger is operated in a water freezeout mode while the other is operated in a regeneration mode to melt or sublime previously-deposited ice in representative passage 305 of heat exchanger 303 for removal of the water from the exchanger. A side stream of purge gas may be withdrawn from the PSA purge gas in line 117 and used as a sweep gas in the regeneration mode if desired.

Either of the water removal methods of FIGS. 3 and 4 may be applied to either of the embodiments of FIGS. 1 and 2. In any of the embodiments described above with reference to FIGS. 1-4, the water may be introduced into the feed gas and/or the purge gas streams during any portion of the feed step and/or any portion of the purge step of the PSA cycle.

The exemplary embodiments described above are illustrated by the use of water as the additional component that is introduced at several specific locations in the process flowsheets of FIGS. 1-4. In the broadest embodiments of the invention, an additional component or multiple additional components may be introduced into any adsorber vessel of a PSA system by any of the following methods:

(1) At least a portion of an additional component may be combined with a portion of the purified oxygen stream from the PSA system to provide a supplemental stream comprising oxygen and the additional component, and the supplemental stream may be combined with the feed gas mixture prior to the PSA system. (2) At least a portion of an additional component may be combined with a portion of a makeup oxygen stream to provide a supplemental stream comprising oxygen and the additional component, and the supplemental stream may be combined with the feed gas mixture prior to the PSA system.

(3) At least a portion of an additional component may be combined with a purge gas to provide a modified purge gas, and the modified purge gas may be introduced into the adsorber vessel during a purge step (4) At least a portion of an additional component may be injected directly into the feed gas mixture prior to the adsorber vessel.

Any combination of (1) through (4) described above may be used as desired to optimize the ozone generation system. For example, a portion of an additional component may be introduced into to the PSA feed gas and another portion introduced into the purge gas.

EXAMPLE 1

The system of FIG. 4 is operated to generate 50 kg/hr of ozone in the product gas via line 119 from PSA system 113. Compressed warm oxygen containing water at a dew point greater than −70° F. via line 301 at a flow rate of 521 kg/hr and a temperature of 80° F. is introduced into representative passage 305 of heat exchanger 303. This stream is cooled to −90° F., thereby freezing the water onto the inner walls of passage 305. The dried oxygen stream flows via line 307 to mixing zone 309, where 4.4 kg/hr of liquid oxygen at −278° F. is mixed with the dried oxygen. The mixed stream at 525.4 kg/hr and −95° F. flows via line 315 and through representative passage 305 of heat exchanger 303, where it warms to provide the refrigeration to cool the oxygen in passage 305. The warm, dry oxygen at 74° F. flows via line 319 to provide recycle oxygen and a portion of the makeup oxygen to ozone generator 105. The remainder of the makeup oxygen at 99.6 kg/hr and 70° F. is provided via line 321.

EXAMPLE 2

The system of FIG. 1 is operated by humidifying the oxygen recycle stream in line 125 to provide a saturated oxygen recycle stream in line 109 that is mixed with the ozone-oxygen stream in line 107 to provide humidified PSA feed gas in line 111. PSA system 113 is operated at steady state in a cycle comprising a six-minute feed step at 70° F. and 30 psig followed by a six-minute purge step at 70° F. and 15 psig, wherein the purge gas is dry air having a dew point of less than −40° F. The water loading on the zeolite adsorbent, e.g., HZSM-5, is maintained between 2 and 15% by weight. A steady-state material balance for this example is given in Table 1 below.

TABLE 1

Material Balance for Example 2 (FIG. 1)

| | \multicolumn{8}{c}{Stream Number} |
|---|---|---|---|---|---|---|---|---|
| | 101 | 103 | 107 | 109 | 111 | 115 | 117 | 119 |
| | | | | Pressure, psia | | | | |
| | 30 | 30 | 29 | 29 | 29 | 27 | 15 | 13 |
| | | | | Molar flow rate, kg mol/hr | | | | |
| Ozone | 0.0 | 0.0 | 1.09 | 0.0 | 1.09 | 0.0 | 0.0 | 1.04 |
| Oxygen | 3.30 | 16.75 | 18.41 | 0.130 | 18.54 | 16.88 | 3.86 | 5.60 |
| Nitrogen | 0.0 | 0.294 | 0.294 | 0.0 | 0.294 | 0.294 | 14.40 | 14.40 |
| Argon | 0.0130 | 0.185 | 0.20 | 0.0 | 0.20 | 0.18 | 0.171 | 0.185 |
| $CO_2$ | 0.0 | 0.006 | 0.01 | 0.0 | 0.01 | 0.006 | 0.006 | 0.006 |
| Water | 0.0 | 0.0 | 0.0 | 0.004 | 0.004 | 0.0 | 0.002 | 0.006 |
| Total | 3.31 | 17.24 | 20.00 | 0.130 | 20.13 | 17.37 | 18.44 | 21.23 |
| | | | | Water concentration, ppmv | | | | |
| | 0.0 | 0.0 | 0.0 | 30,577 | 197.5 | 0.0 | 115.0 | 287.1 |

The invention claimed is:

1. An adsorption process for the recovery of ozone from a feed gas mixture containing at least ozone and oxygen comprising
   (a) introducing the feed gas mixture into a first end of an adsorber vessel containing a zeolite adsorbent and selectively adsorbing ozone on the adsorbent;
   (b) withdrawing from a second end of the adsorber vessel a stream of oxygen essentially free of ozone;
   (c) terminating the flow of the feed gas mixture to the adsorber vessel, introducing a purge gas into the second end of the adsorber vessel, and withdrawing from the first end of the vessel an outlet gas mixture containing at least purge gas and desorbed ozone; and
   (d) introducing an additional component into the feed gas mixture or the feed gas mixture and the purge gas and adsorbing the additional component on the zeolite adsorbent, wherein the additional component when adsorbed reduces the decomposition of ozone that would occur in the absence of the additional component adsorbed on the zeolite adsorbent.

2. The process of claim 1 wherein the amount of the additional component that is introduced into the feed gas mixture or the purge gas is selected to maintain a degree of ozone decomposition in the adsorber vessel below a predetermined level.

3. The process of claim 1 wherein the additional component is selected from the group consisting of water, carbon dioxide, argon, sulfur hexafluoride, and mixtures thereof.

4. The process of claim 1 wherein the zeolite adsorbent is selected from the group consisting of chabazite, erionite, mordenite, offretite, ZSM-5, HZSM-5, ZSM-11, ZSM-12, L-zeolite, ferrierite, beta zeolite, Y-type zeolite, and combinations thereof.

5. The process of claim 2 wherein the predetermined level of ozone decomposition is less than about 5% of the amount of ozone in the feed gas mixture.

6. The process of claim 1 wherein the temperature at any point in the adsorber vessel during steps (a) through (d) is in the range of 0 to 40° C.

7. The process of claim 1 wherein the purge gas is selected from the group consisting of air, nitrogen, and oxygen.

8. The process of claim 1 wherein the additional component is water.

9. The process of claim 8 wherein the water is introduced into the feed gas mixture as a supplemental feed gas comprising oxygen and water.

10. The process of claim 9 wherein the supplemental feed gas is at 20 to 100% relative humidity.

11. The process of claim 8 wherein the molar ratio of water to ozone in the modified feed gas mixture is in the range of 0.0002 to 0.7.

12. A process for the production of ozone comprising
   (a) introducing an oxygen feed stream into an ozone generator and withdrawing therefrom a mixture of oxygen and ozone;
   (b) combining the mixture of oxygen and ozone with a supplemental stream comprising humidified oxygen to form a combined stream comprising oxygen, ozone, and water;
   (c) passing the combined stream into a pressure swing adsorption system and selectively adsorbing ozone and water in an adsorption step on a zeolite adsorbent contained therein, wherein the water when adsorbed reduces the decomposition of ozone that would occur in the absence of adsorbed water on the zeolite adsorbent;
   (d) withdrawing from the pressure swing adsorption system an oxygen outlet stream essentially free of ozone;
   (e) terminating the flow of the combined stream into the pressure swing adsorption system, introducing a purge gas into the pressure swing adsorption system in a regeneration step, and withdrawing therefrom a product gas comprising ozone, the additional component, and purge gas; and either
   (f) humidifying a portion of the oxygen outlet stream of (d) to provide the supplemental stream comprising humidified oxygen in (b) and combining the remaining portion of the oxygen outlet stream with a makeup oxygen stream to provide the oxygen feed stream of (a), or
   (g) humidifying a portion of a makeup oxygen stream to provide the supplemental stream comprising humidified oxygen in (b) and utilizing the oxygen outlet stream of (d) to provide the oxygen feed stream of (a).

13. The process of claim 12 wherein the amount of water introduced into the feed gas mixture is selected to maintain a degree of ozone decomposition in the pressure swing adsorption system below a predetermined level.

14. The process of claim 12 wherein the remaining portion of the oxygen outlet stream contains residual water and is treated in a water removal process to remove residual water prior to combination with the makeup oxygen.

15. The process of claim 14 wherein the water removal process is an adsorption process in which the residual water is adsorbed by a water-selective adsorbent during an adsorption step and adsorbed water is removed from the adsorbent during a regeneration step in which the adsorbent is purged with a portion of the purge gas used in step (e).

16. The process of claim 14 wherein the water removal process comprises a refrigerated heat exchanger in which the residual water in the remaining portion of the oxygen outlet stream is frozen out in the heat exchanger to provide a dried oxygen recycle stream.

17. The process of claim 16 wherein the makeup oxygen stream is provided by
   (1) vaporizing a first liquid oxygen stream obtained from a liquid oxygen storage system to provide a vaporized oxygen stream;
   (2) mixing a second liquid oxygen stream obtained from the liquid oxygen storage system with the dried oxygen recycle stream to provide a mixed oxygen stream, warming the mixed oxygen stream in the heat exchanger to provide by indirect heat transfer the refrigeration to cool the remaining portion of the oxygen outlet stream and freeze out the water contained therein; and
   (3) withdrawing a warmed mixed oxygen stream from the heat exchanger and combining it with the vaporized oxygen stream of (1) to provide the oxygen feed stream to the ozone generator.

18. The process of claim 12 wherein the zeolite adsorbent is selected from the group consisting of chabazite, erionite, mordenite, offretite, ZSM-5, HZSM-5, ZSM-11, ZSM-12, L-zeolite, ferrierite, beta zeolite, Y-type zeolite, and combinations thereof.

19. The process of claim 12 wherein the predetermined level of ozone decomposition is less than about 5% of the amount of ozone in the feed gas mixture.

20. The process of claim 12 wherein the temperature at any point in the adsorber vessel during steps (a) through (d) is in the range of 0 to 40° C.

21. The process of claim 12 wherein the purge gas is selected from the group consisting of air, nitrogen, and oxygen.

22. An adsorption process for the recovery of ozone from a feed gas mixture containing at least ozone and oxygen comprising
- (a) introducing the feed gas mixture into a first end of an adsorber vessel containing a modified zeolite adsorbent having an additional component adsorbed thereon and selectively adsorbing ozone on the modified zeolite adsorbent, wherein the additional component when adsorbed reduces the decomposition of ozone that would occur in the absence of the additional component adsorbed on the zeolite adsorbent;
- (b) withdrawing from a second end of the adsorber vessel a stream of oxygen essentially free of ozone; and
- (c) terminating the flow of the feed gas mixture to the adsorber vessel and withdrawing from the first end of the vessel an outlet gas containing at least desorbed ozone;

wherein the additional component is introduced into the adsorber vessel by any of
- (1) combining at least a portion of the additional component with a portion of the oxygen stream of (b) to provide a supplemental stream comprising oxygen and the additional component, and combining the supplemental stream with the feed gas mixture in (a),
- (2) combining at least a portion of the additional component with a portion of a makeup oxygen stream to provide a supplemental stream comprising oxygen and the additional component, and combining the supplemental stream with the feed gas mixture in (a),
- (3) injecting at least a portion of the additional component directly into the feed gas mixture prior to the adsorber vessel in step (a).

23. The process of claim 22 wherein the additional component is selected from the group consisting of water, carbon dioxide, argon, sulfur hexafluoride, and mixtures thereof.

24. The process of claim 22 wherein the modified zeolite adsorbent is provided by introducing all of the additional component into the feed gas mixture during at least a portion of step (a).

25. The process of claim 22 further comprises: combining at least a portion of the additional component with a purge gas to provide a modified purge gas, and introducing the modified purge gas into the adsorber vessel in step (c).

26. The process of claim 25 wherein step (c) comprises introducing the purge gas containing at least a portion of the additional component into the second end of the adsorber vessel to effect desorption of adsorbed ozone and to adsorb the additional component, and wherein the outlet gas contains at least desorbed ozone and purge gas.

* * * * *